United States Patent
Arsenault et al.

(10) Patent No.: US 9,668,105 B2
(45) Date of Patent: May 30, 2017

(54) SYSTEM AND METHOD FOR IDENTIFYING LOCATIONS OF MOBILE ELEMENTS IN A FACILITY WITH A NUMBER OF REGIONS

(71) Applicant: K4 Integration Inc., Sudbury (CA)

(72) Inventors: Gilles Arsenault, Sudbury (CA); Marcel Houle, Sudbury (CA)

(73) Assignee: K4 Integration Inc., Sudbury, Ontario (CA)

( * ) Notice: Subject to any disclaimer, the term of this patent is extended or adjusted under 35 U.S.C. 154(b) by 0 days.

(21) Appl. No.: 14/682,292

(22) Filed: Apr. 9, 2015

(65) Prior Publication Data

US 2016/0300089 A1 Oct. 13, 2016

(51) Int. Cl.
| | |
|---|---|
| H04W 4/04 | (2009.01) |
| G06K 7/10 | (2006.01) |
| G06K 17/00 | (2006.01) |
| G08B 13/14 | (2006.01) |
| G08B 5/22 | (2006.01) |

(52) U.S. Cl.
CPC .......... *H04W 4/04* (2013.01); *G06K 7/10356* (2013.01); *G06K 2017/0045* (2013.01); *G08B 5/22* (2013.01); *G08B 13/149* (2013.01)

(58) Field of Classification Search
CPC . G06K 2017/0045; G08B 5/22; G08B 13/149
See application file for complete search history.

(56) References Cited

U.S. PATENT DOCUMENTS

| | | |
|---|---|---|
| 5,801,628 A | 9/1998 | Maloney |
| 6,005,482 A | 12/1999 | Moran et al. |
| 6,131,808 A | 10/2000 | Pires et al. |
| 6,400,272 B1 | 6/2002 | Holtzman et al. |
| 6,431,438 B1 | 8/2002 | Pires et al. |
| 6,592,028 B2 | 7/2003 | Pires et al. |
| 6,737,961 B2 | 5/2004 | Flick |
| 6,837,429 B2 | 1/2005 | Pires et al. |
| 6,880,754 B1 | 4/2005 | Lie-Nielsen et al. |
| 7,471,209 B2 | 12/2008 | Hart |
| 7,791,483 B2 | 9/2010 | Oberle |
| 8,816,850 B2 | 8/2014 | Bandyopadhyay et al. |
| 2004/0174269 A1 | 9/2004 | Miller et al. |
| 2005/0246248 A1* | 11/2005 | Vesuna ................ G06K 7/0008 705/28 |
| 2009/0153309 A1* | 6/2009 | Kim .................... G06K 7/0008 340/10.51 |
| 2013/0314904 A1 | 11/2013 | Dirsa et al. |

FOREIGN PATENT DOCUMENTS

CA 2690752 A1 12/2008

* cited by examiner

*Primary Examiner* — Daniell L Negron

(57) ABSTRACT

A system for identifying respective locations of mobile elements in a number of regions. The system includes a number of board RFID tags, each of which is associated with a selected one of the mobile elements respectively, and a board subassembly including a body element with a front surface divided into a number of portions of the front surface that correspond to the regions respectively, and one or more board RFID reader subassemblies including a number of antennas, the antennas being associated with respective portions, and one or more board RFID readers that are operatively connected with the antennas. The board RFID tags located in the respective portions are readable by the board RFID readers connected with the antennas associated with the respective portions.

8 Claims, 9 Drawing Sheets

SYSTEM AND METHOD FOR IDENTIFYING LOCATIONS OF MOBILE ELEMENTS IN A FACILITY WITH A NUMBER OF REGIONS

FIELD OF THE INVENTION

The present invention is a system and a method for identifying respective locations of mobile elements in a number of regions.

BACKGROUND OF THE INVENTION

Certain industrial facilities, such as mines and mills, are large operations with a number of regions or areas, and for a number of reasons, it is important to have a record of whether the workers are in the facility, and where the workers in the facility, or mobile equipment, or both, are located. The typical methods and systems for doing so are very simple, and have a number of disadvantages.

For example, at many facilities, "tag boards" are used to indicate who is in the facility, and who is not. The prior art tag board typically has a substantially vertical flat surface, with a number of tag hooks mounted on the surface. If the facility is an underground mine, then the surface of the tag board may be divided into two areas, "surface" and "underground". In other facilities, the two areas typically are designated otherwise, e.g., "in" and "out". Each worker has a physical tag (e.g., a metal disk) that may be hung on a tag hook. The intention is that each worker moves his tag from one area to the other as he enters or leaves the facility, as appropriate.

Other prior art versions may include other types of boards and tags, e.g., a magnetic board may be used, with magnets serving as tags.

There are a number of problems with the prior art tag boards. For example, the incoming worker may forget to move his tag from the "out" area to the "in" area. Also, the worker who leaves the facility may forget to move his tag from the "in" area to the "out" area.

Depending on the business or facility, in certain circumstances, these types of mistakes may have serious consequences. For example, where the tag board is used at an underground mine, a worker's failure to move his tag from the "in" area to the "out" area may, if there is an accident or explosion underground, cause search and rescue personnel to search for that person unnecessarily, sometimes putting their own lives at risk in the process.

There are many other problems or shortcomings with the prior art boards. For instance, the board does not include any means for keeping track of the time when a particular worker entered the facility, or exited.

Finally, because the prior art tags and tag boards are manually used, the information they provide is limited, and to obtain any such information (e.g., how many workers are in the facility at a particular time), an administrative employee must be physically present at the board, and manually count the tags. Also, the administrative employee would have to determine whose tags are in the "in" (or underground) part of the board. This is time-consuming, especially if there are a large number of workers involved. In addition, because the information is only on the board, it would not be available if, for example, the board is destroyed or inaccessible due to an accident.

SUMMARY OF THE INVENTION

For the foregoing reasons, there is a need for a system and method for identifying mobile elements in a facility with a number of regions that overcomes or mitigates one or more of the disadvantages or defects of the prior art. Such disadvantages or defects are not necessarily included in those described above.

In its broad aspect, the invention provides a system for identifying respective locations of mobile elements in a number of regions, each mobile element to be located in a selected one of the regions within a preselected time period. The system includes a tag board assembly having a number of board RFID tags, each board RFID tag being associated with a selected one of the mobile elements respectively, and a board subassembly. The board subassembly includes a body element with a front surface divided into a plurality of portions of the front surface that correspond to the regions respectively, and one or more board RFID reader subassemblies. The board RFID reader subassembly includes a number of antennas, the antennas being associated with respective portions, one or more board RFID readers that are operatively connected with the antennas, and one or more multiplexers operatively connecting the antennas and the board reader. Each of the board RFID tags respectively includes a tag memory with tag data thereof related to the selected one of the mobile elements with which each board RFID tag is respectively associated. The board RFID tags that are located in the respective portions and the antennas associated with the respective portions are configured to be coupled via respective electromagnetic fields associated with the respective portions so that the tag memories of the board RFID tags located in the respective portions are readable respectively by the board RFID readers connected with the antennas associated with the respective portions. The board subassembly also includes one or more electromagnetically opaque shield elements. The shield element is secured to a rear surface of the body element opposed to the front surface thereof and formed to guide the respective electromagnetic fields associated with the respective portions so that the respective portions are within the electromagnetic fields respectively.

In another of its aspects, the invention provides a system for identifying respective locations of mobile elements in a number of regions. Each mobile element is to be located in a selected one of the regions within a preselected time period. The system has a tag board assembly including a number of board RFID tags, each board RFID tag being associated with a selected one of the mobile elements respectively, and a board subassembly. The board subassembly includes a body element with a front surface divided into a number of portions of the front surface that correspond to the regions respectively, and one or more board RFID reader subassemblies. The board RFID subassembly includes a number of antennas, the antennas being associated with respective portions, and one or more board RFID readers that are operatively connected with the antennas. Each of the board RFID tags respectively includes a tag memory with tag data thereof related to the selected one of the mobile elements with which each board RFID tag is respectively associated. Each board RFID tag that is located in a first one of the portions and the antenna associated with the first one of the portions are configured to be coupled via a first electromagnetic field in which the first one of the portions is located so that the respective tag memories of the board RFID tags located in the first one of the portions is readable by the board RFID reader connected with the antenna associated with the first one of the portions. Each board RFID tag is movable from the first one of the portions to a second one of the portions that corresponds to the selected one of the regions where the mobile element associated with each board RFID tag respectively is to be located in the preselected time period. Each board RFID tag that is located in the second one of the portions and the antenna associated with the second one of the portions are configured to be coupled via a second electromagnetic field in which the second one of the portions is located so that the board RFID reader subassembly therefor generates time data that specifies when the board RFID tag is moved to the second one of the portions.

In yet another of its aspects, the board subassembly additionally includes one or more electromagnetically opaque shield elements. The shield element is secured to a rear surface of the body element opposed to the front surface thereof and positioned to locate the antennas associated with the respective first and second portions for guiding the respective first and second electromagnetic fields for the first and second portions respectively so that the first and second electromagnetic fields are substantially within the respective first and second portions.

In another aspect, the invention provides a system for identifying respective locations of mobile elements in a number of regions. Each mobile element is to be located in a selected one of the regions within a preselected time period. The system includes a tag board assembly having a number of board RFID tags, each board RFID tag being associated with a selected one of the mobile elements, and a board subassembly. The board subassembly includes a body element with a front surface divided into a number of portions of the front surface that correspond to the regions respectively, and one or more board RFID subassemblies. The board RFID subassembly includes a number of antennas, the antennas being associated with respective portions, and one or more board RFID readers that are operatively connected with the antennas. Each of the board RFID tags respectively has a tag memory with tag data thereof related to the selected one of the mobile elements with which each board RFID tag is respectively associated. When each board RFID tag is located in a selected one of the portions, the tag memory thereof is readable by the board RFID reader that is connected with the antenna associated with the selected one of the portions. Each board RFID tag is removable, substantially at the beginning of the preselected time period therefor respectively, from the selected one of the portions. Each board RFID tag thereafter is securable, substantially at the beginning of the preselected time period therefor respectively, to the mobile element with which the board RFID tag is associated respectively. Upon the board RFID tag being removed from the selected one of the portions, the board RFID reader connected with the antenna associated with the selected one of the portions detects the removal thereof, and generates time data that specifies when the board RFID tag is removed from the selected one of the portions.

In another of its aspects, a system also includes one or more regional RFID reader subassemblies positioned in a selected one of the regions, for reading the tag memories of the board RFID tags secured to the mobile elements associated therewith respectively when the mobile elements are within a predetermined range distance from the regional RFID reader subassembly. This enables the regional RFID reader subassembly to identify the board RFID tags that are within the predetermined range distance respectively and to provide location data approximately locating the mobile elements to which the board RFID tags are respectively secured.

In yet another of its aspects, the invention provides a method of identifying respective locations of mobile elements in a number of regions during a preselected time period. The method includes providing a tag board assembly having a number of board RFID tags, each board RFID tag being associated with a selected one of the mobile elements, and a board subassembly. The board subassembly includes a body element with a front surface marked to designate a number of portions of the front surface to correspond with the regions respectively, and one or more board RFID reader subassemblies. The board RFID subassembly includes a number of antennas, the antennas being associated with respective portions, and one or more board RFID readers that are operatively connected with the antennas. When each board RFID tag is located in a selected one of the portions, the tag memory thereof is readable by the board RFID reader that is connected with the antenna associated with the selected one of the portions. Next, a selected one of the board RFID tags is moved from an initial one of the portions to a second one of the portions that corresponds to the selected one of the regions where the mobile element associated with the selected one of the board RFID tags respectively is to be located in the preselected time period. Upon the selected one of the board RFID tags being positioned in the second one of the portions, with the board RFID readers connected with the antenna associated with the second selected one of the portions, the selected one of the board RFID tags is detected in the second one of the portions, to generate time data that specifies when the selected one of the board RFID tags is moved to the second one of the portions.

BRIEF DESCRIPTION OF THE DRAWINGS

The invention will be better understood with reference to the attached drawings, in which.

DETAILED DESCRIPTION

Figure 1A:
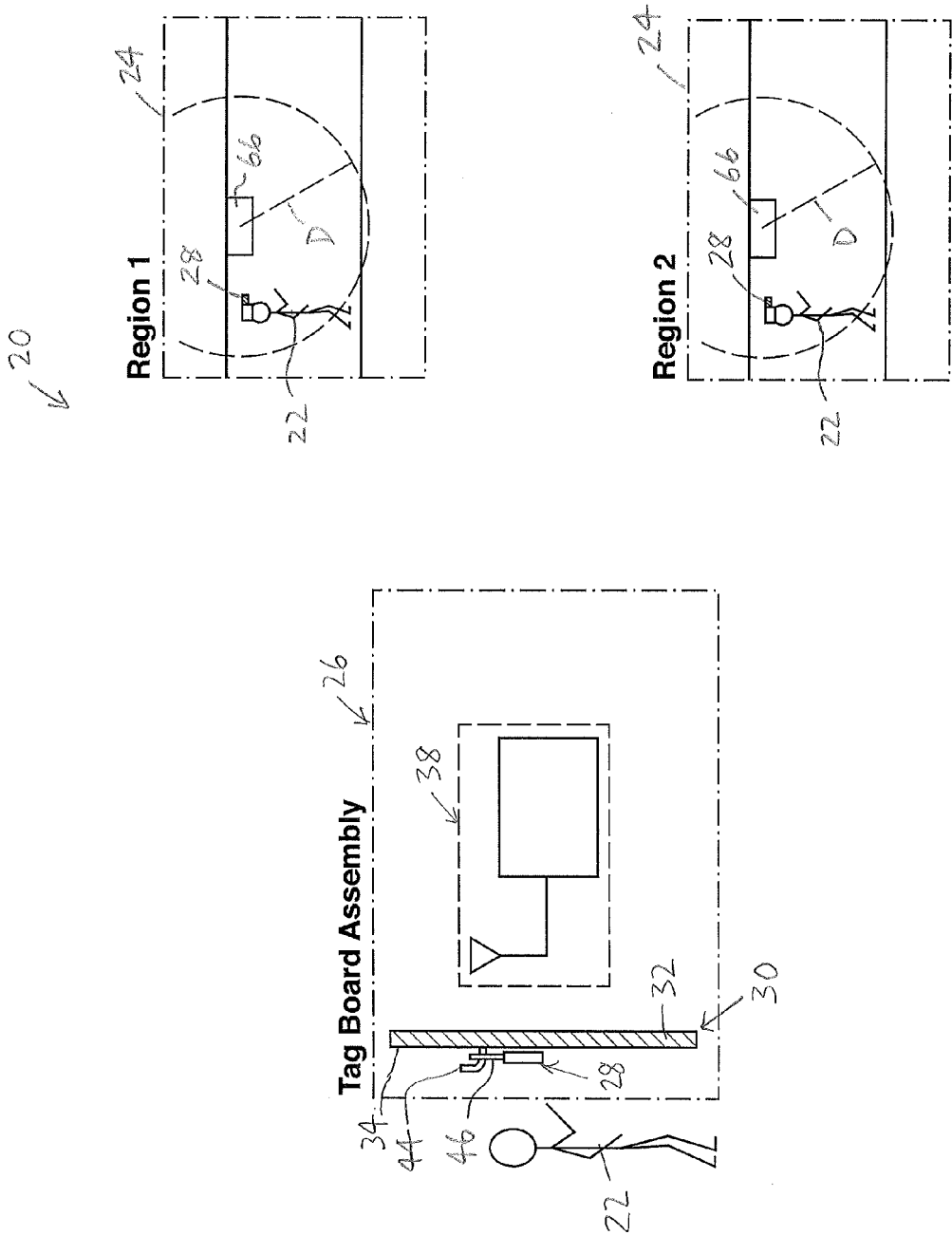
FIG. 1A is a schematic illustration of an embodiment of a system of the invention.
Figure 1B:
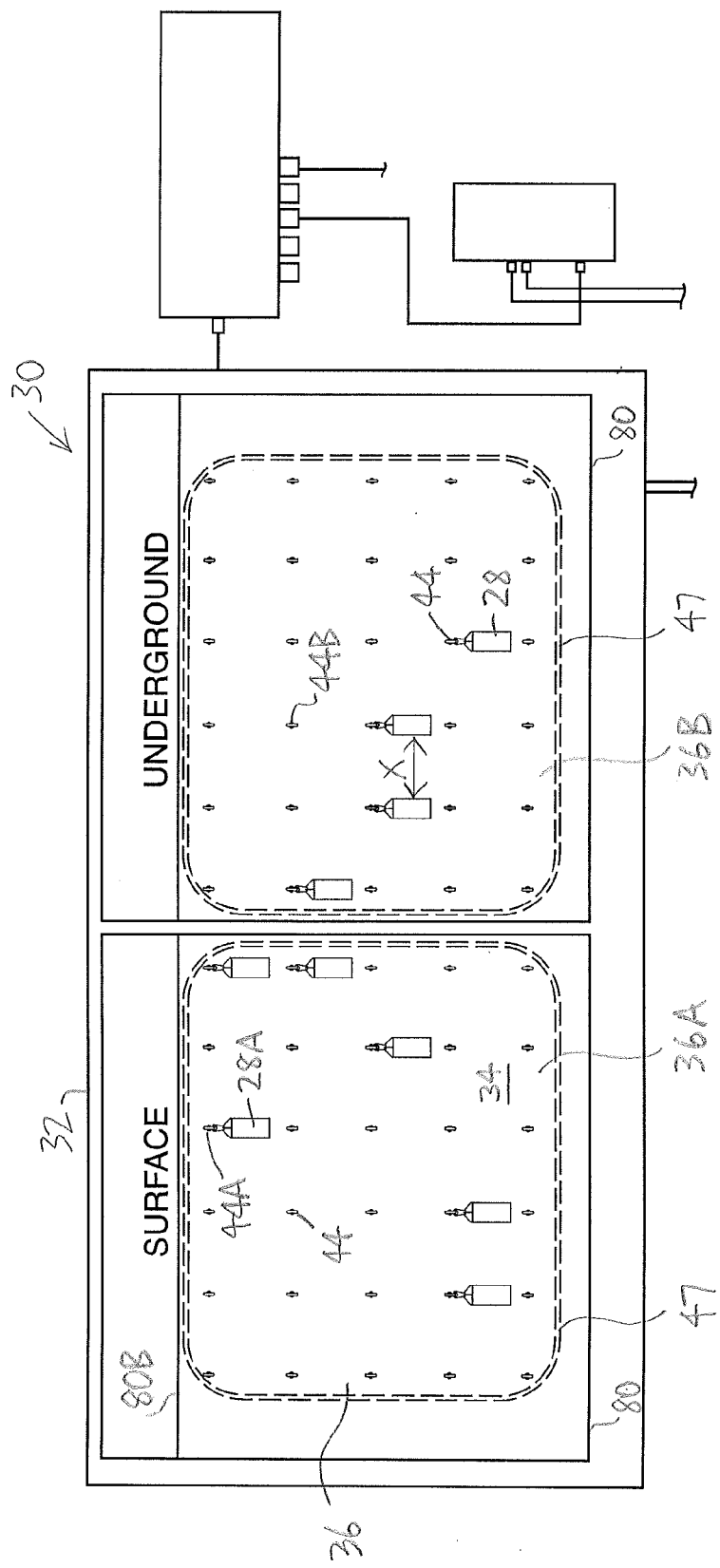
FIG. 1B is a front view of an embodiment of a tag board assembly of the invention.
Figure 1C:
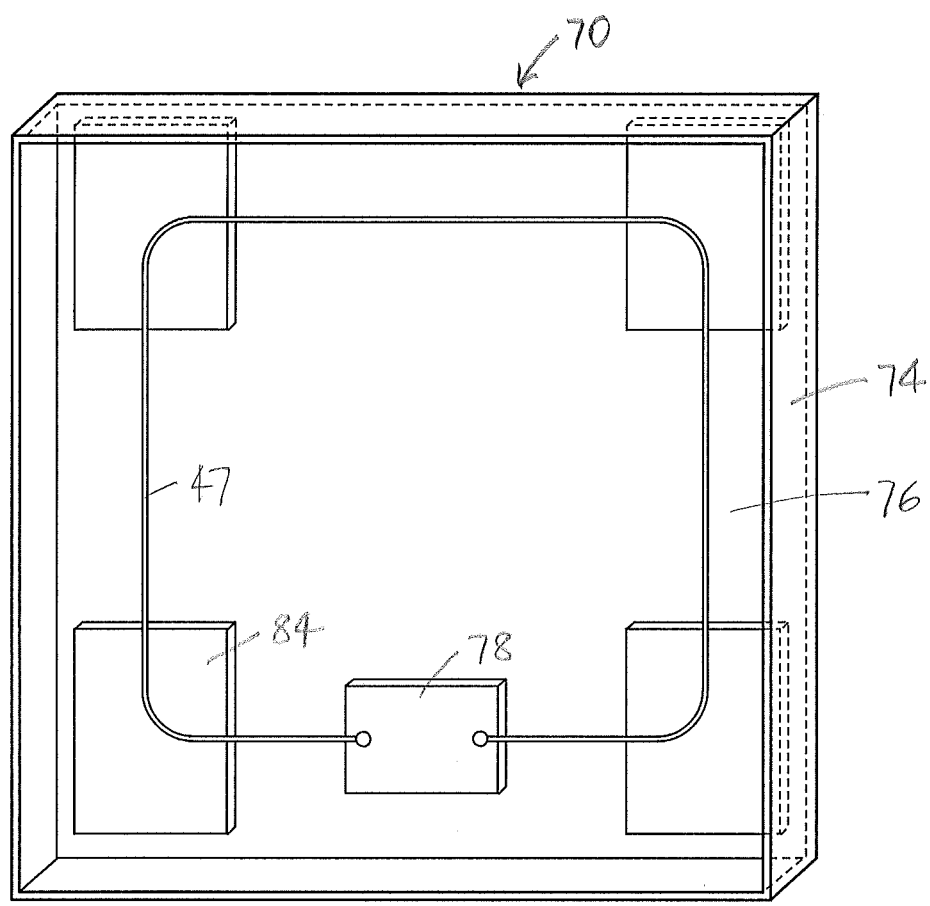
FIG. 1C is a rear view of a portion of the tag board assembly of FIG. 1B, drawn at a larger scale.

In the attached drawings, like reference numerals designate corresponding elements throughout. Reference is made to FIGS. 1A-1G, 2, and 3 to describe an embodiment of a system of the invention in accordance with the invention indicated generally by the numeral 20 (FIG. 1A). As will be described, the system 20 is for identifying respective locations of mobile elements 22 in a plurality of regions 24. Each of the mobile elements 22 is to be located in a selected one of the regions 24 within a preselected time period. In one embodiment, the system 20 preferably includes a tag board assembly 26. It is preferred that the tag board assembly 26 includes a number of board RFID tags 28, and each board RFID tag 28 preferably is associated with a selected one of the mobile elements 22 (FIGS. 1A, 1B). In one embodiment, the system 20 preferably also includes a board subassembly 30 that has a body element 32 with a front surface 34 marked to designate a number of portions 36 of the front surface 34 that correspond to the regions 24 respectively (FIG. 1B). As can be seen in FIG. 2, it is also preferred that the board subassembly 30 includes one or more board RFID reader subassemblies 37. Preferably, each board RFID reader subassembly 37 includes one or more antennas 47 that are respectively associated with respective portions 36, as will also be described. The board RFID reader subassembly 37 preferably also includes one or more board RFID readers 38. The board RFID readers 38 preferably are operatively connected with the antennas 47. As will also be described, each of the board RFID tags 28 has a tag memory 40 respectively with tag data 42 thereof related to the selected one of the mobile elements 22 with which each board RFID tag 28 is respectively associated (FIG. 1F). Preferably, each board RFID tag 28 that is located in a first one of the portions 36 and the antenna 47 associated with the same portion 36 are configured to be coupled via a first electromagnetic field in which that portion 36 is located, so that each tag memory 40 of each respective board tag 28 located in that portion 36 is readable by the board RFID reader 38 connected with the antenna 47 that is associated with such portion 36.

In one embodiment, each board RFID tag 28 preferably is movable from the first one of the portions 36 to a second one of the portions 36 that corresponds to the selected one of the regions 24 where the mobile element 22 that is associated with the board RFID tag 28 respectively is to be located in the preselected time period. The board RFID tag 28 located in the second one of the portions 36 and the antenna 47 associated with the second one of the portions 36 are configured to be coupled, via a second electromagnetic field in which the second one of the portions 36 is located, so that the board RFID reader subassembly 37 generates time data that specifies when the board RFID tag 28 is moved to the second portion 36.

It is also preferred that the board RFID reader subassembly 37 includes a multiplexer 43 operatively connected with the antennas 47 and the board RFID reader 38.

As can be seen in FIG. 1A, the mobile element 22 may be, for example, a worker. Alternatively, and as will be described, the mobile element 22 may be a unit of equipment or material, e.g., a vehicle, or any type of equipment or material that is movable to different regions. As noted above, each of the board RFID tags 28 is associated with or assigned to one of the mobile elements 22 respectively. In general, the regions 24 preferably are respectively defined according to their respective physical locations, although they may also, or alternatively, be defined according to other aspects thereof, e.g., for administrative convenience, or on functional bases. It will be understood that the board subassembly as illustrated in FIGS. 1A-1F and 2 includes only two portions for clarity of illustration.

The regions 24 may be any suitably defined regions, for example, the regions 24 may be parts of an underground mine, and/or they may be parts of a mill, or factory, or office complex, or other plant located on the surface, or simply defined by function. Alternatively, the regions 24 may be specified parts of a surface mine.

In one embodiment, when entering the facility, the worker 22 simply moves his board RFID tag 28 from the initial portion 36 (i.e., the portion in which it is initially positioned) to the second portion 36. As noted above, the second portion 36 corresponds to the region 24 in which the worker intends to be working within the preselected time period, e.g., for the duration of his shift. Once the shift is over, as the worker exits the facility, he moves his board RFID tag to the portion 36 that corresponds to the region where he intends to be for the next preselected time period, e.g., the time period until the worker next returns to work. This would generally mean that, the worker would move his board RFID tag 28 from the second portion back to the initial portion as the worker exits, at the end of his shift.

For example, in FIG. 1B, the front surface 34 is divided into only two portions 36, identified for illustrative purposes as "surface" and underground". (It will be understood that there are as many portions as there are regions.) As an example, the worker 22 starting his shift moves his board RFID tag 28 from the "surface" portion (i.e., the initial portion) to the "underground" portion (i.e., the second portion), and the worker expects to remain underground for the balance of his shift (i.e., during the predetermined time period). It is intended that, as the worker exits the facility at the end of his shift, he moves his board RFID tag 28 from the "underground" portion to the "surface" portion.

From the foregoing, it is clear that there may be any number of portions, i.e., at least two. As noted above, the portions may be defined according to function or on an administrative or other basis as well as, or instead of, physical locations. For example, even if only two portions are used for operations, another portion (not shown) may be designated, if desired, as being where the board RFID tags of those workers on vacation should be located.

For the purposes hereof, the board RFID tag 28 is considered to be "in the portion" when the tag memory of the board RFID tag that is positioned proximal to a particular portion is readable by the board RFID reader for that portion.

It will be understood that the board RFID tags 28 preferably are positioned in the portions 36 in any suitable manner. For instance, in the embodiment of the tag board assembly 26 illustrated in FIGS. 1A and 1B, the board subassembly 30 preferably includes a number of hooks 44 that are secured to the body element 32 in any suitable manner. The board RFID tag 28 preferably also includes a tag body 46 that is partially formed to cooperate with the hook 44, so that the tag body 46 preferably can be hung on the hook 44, and held there by gravity.

Two hooks 44A, 44B are identified in FIG. 1B for the purposes of illustration. As illustrated, the tag 44A is in the initial ("surface") portion, and the tag 44B is in the second ("underground") portion. It will be understood that the worker 22 associated with the board RFID tag identified as 28A in FIG. 1B moves the board RFID tag 28A to the hook 44B when he is about to go underground. Similarly, when the worker 22 exits the underground region 24, the worker 22 moves the tag 28A to the hook 44A, to indicate that he is no longer underground.

If the mobile element 22 not a worker, but is (for example) an item of equipment, then a person responsible for the equipment moves the board RFID tag 28 for that item of equipment 22 to the portion 36 that corresponds to the region 24 in which the item 22 is to be used for the preselected time period, e.g., all or part of the shift, or longer. In this case, if the item of equipment 22 is expected to remain in the same region for several shifts, then the board RFID tag 28 associated with that item of equipment remains in the portion 36 for that region 24 during that time.

For the purposes hereof, "RFID" mean "radio frequency identification", and refers to transferring data via electromagnetic fields, typically coupled due to proximity. In general terms, and as is known in the art, the board RFID reader subassembly 37 periodically generates an alternating electromagnetic field that matches a resonant frequency of the board RFID tag 28. In one mode of operating ("read"), the electromagnetic field is used to power to board RFID tag 28 and to retrieve information stored in the tag memory 42. As will be described, in another mode of operating ("write"), the electromagnetic field is used to transmit information to the tag memory 42, or otherwise to the tag 28. As is known in the art, the coupling range of the board RFID tag 28 relative to the board RFID reader 38 is limited. However, it will be understood that the invention herein may utilize any suitable methods of transmitting and receiving data.

As noted above, in the invention herein, the front surface 34 of the body element 32 may be divided into two or more portions 36. It is believed that, in most facilities, it would be expedient to divide the front surface 34 into several portions, e.g., to take into account several underground regions. It will be understood that, for each portion 36, one of the antennas 47 is associated therewith exclusively. As described above, each of the portions preferably is located in its respective electromagnetic field, for coupling the board RFID reader subassembly 37 for each portion respectively with the board RFID tags 28 that are located in or on the portion respectively. For example, a schematic outline of an electromagnetic field for one portion is identified in FIG. 1E by the reference letter "F". As can be seen in FIG. 1E, at its outermost extent, the electromagnetic field intersects the front surface of the board element 32 at an edge of the portion 36.

Accordingly, the electromagnetic field for a particular portion is formed so that it is limited in its scope to that portion. As can be seen in FIGS. 1C-1F, the board subassembly 30 preferably also includes one or more electromagnetically opaque shield elements 70. Preferably, the shield element 70 is secured to a rear surface 72 of the body element 32 opposed to the front surface 34 thereof and positioned to locate the antennas associated with the respective portions 36 for guiding the respective first and second electromagnetic fields for the first and second portions respectively so that the first and second electromagnetic fields are substantially within the first and second portions respectively. In particular, the predetermined location of the shield element 70 is such that the shield element defines an area 73 on the rear surface 72 that is substantially aligned with the corresponding portion 36 on the front surface 34, as will be described.

For clarity of illustration, the portions identified as "surface" and "underground" in FIG. 1B are referred to as 36A and 36B respectively in FIG. 1B. The antenna associated with the portion 36B is identified by reference numeral 47B for convenience, and the antenna associated with the portion 36A is identified by reference numeral 47A (FIGS. 1B, 1D-1F). (It will be understood that a number of elements are omitted from FIGS. 1C-1F for clarity of illustration.) In addition, the locations of the antennas 47 are indicated by dashed lines in FIG. 1B, showing their respective positions relative to the portions 36 with which they are associated.

Figure 1D:
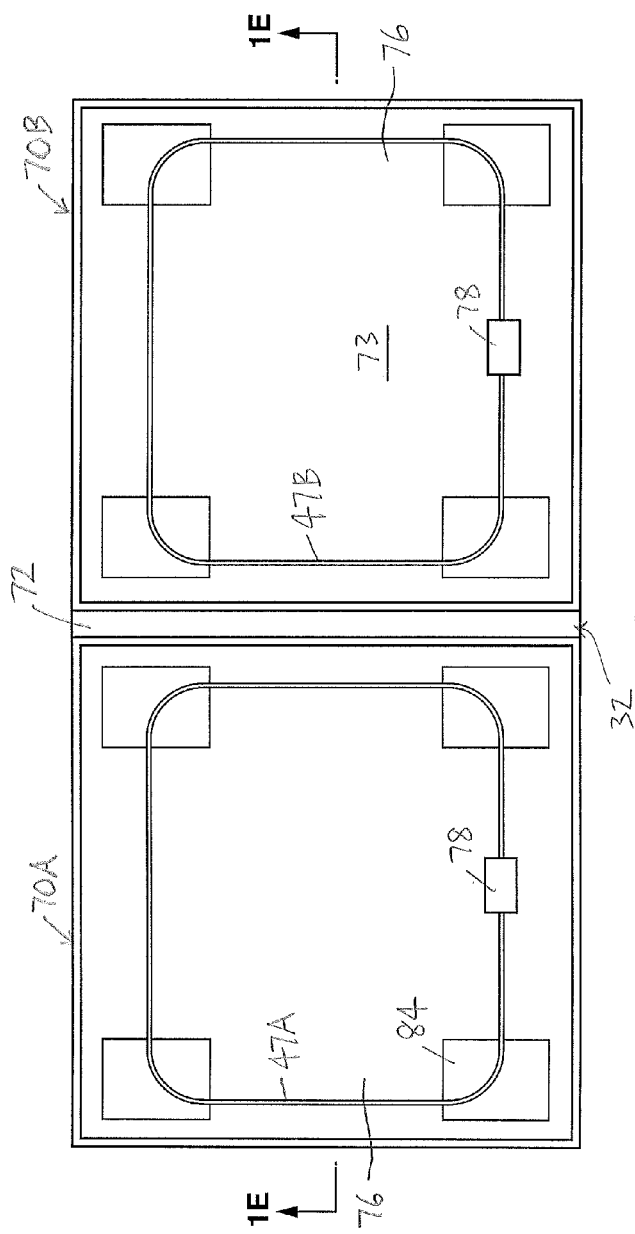
FIG. 1D is a rear view of the tag board assembly of FIG. 1B, drawn at a smaller scale.
Figure 1E:
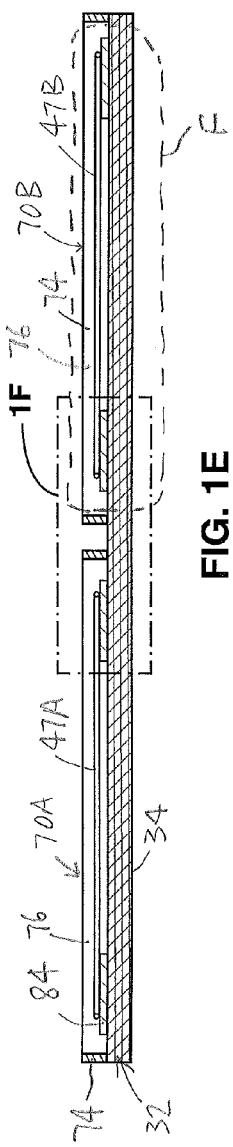
FIG. 1E is a cross-section of the tag board assembly of FIGS. 1B, 1C, and 1D.
Figure 1F:
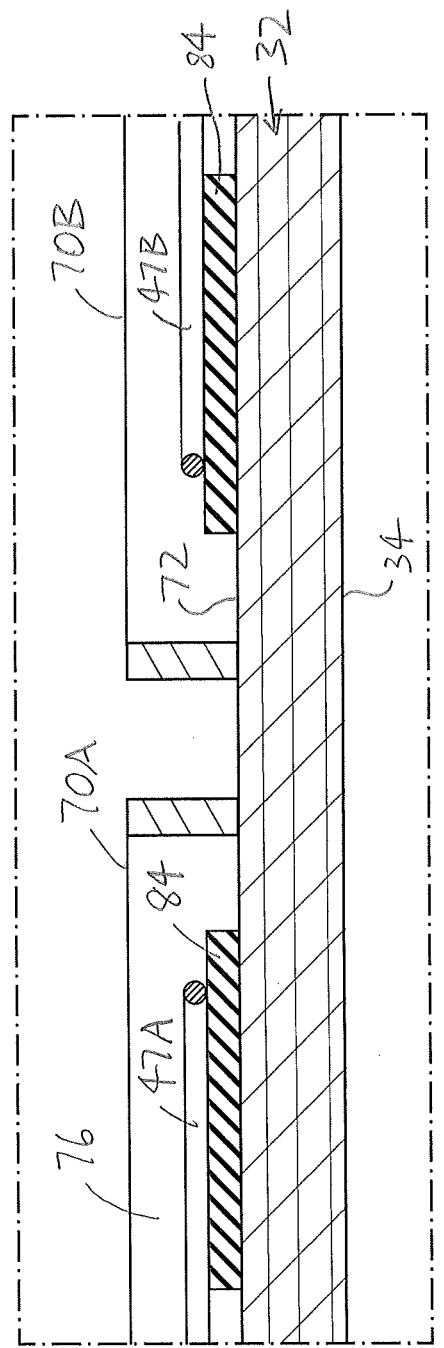
FIG. 1F is a cross-section of a part of the tag board assembly of FIGS. 1B and 1D, drawn at a larger scale.
Figures 1G, 1H:
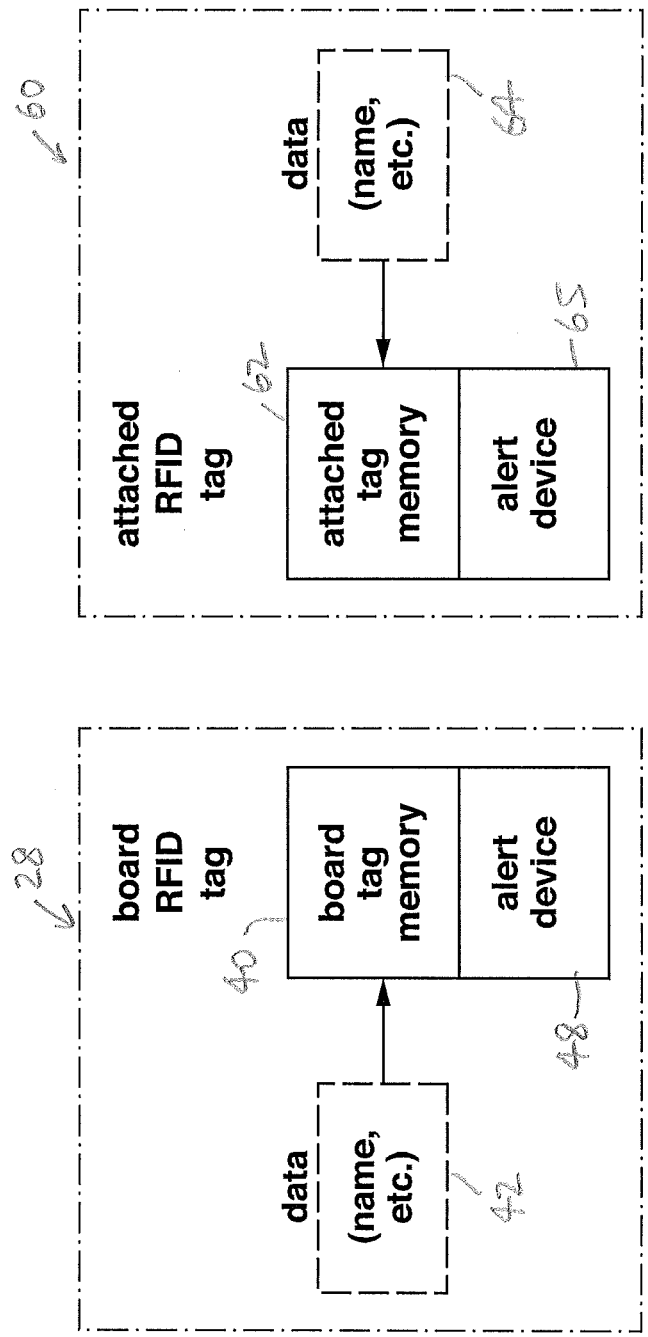
FIG. 1G is a schematic illustration of an embodiment of a board RFID tag of the invention.
FIG. 1H is a schematic illustration of an embodiment of an attached RFID tag of the invention.
Figure 2:
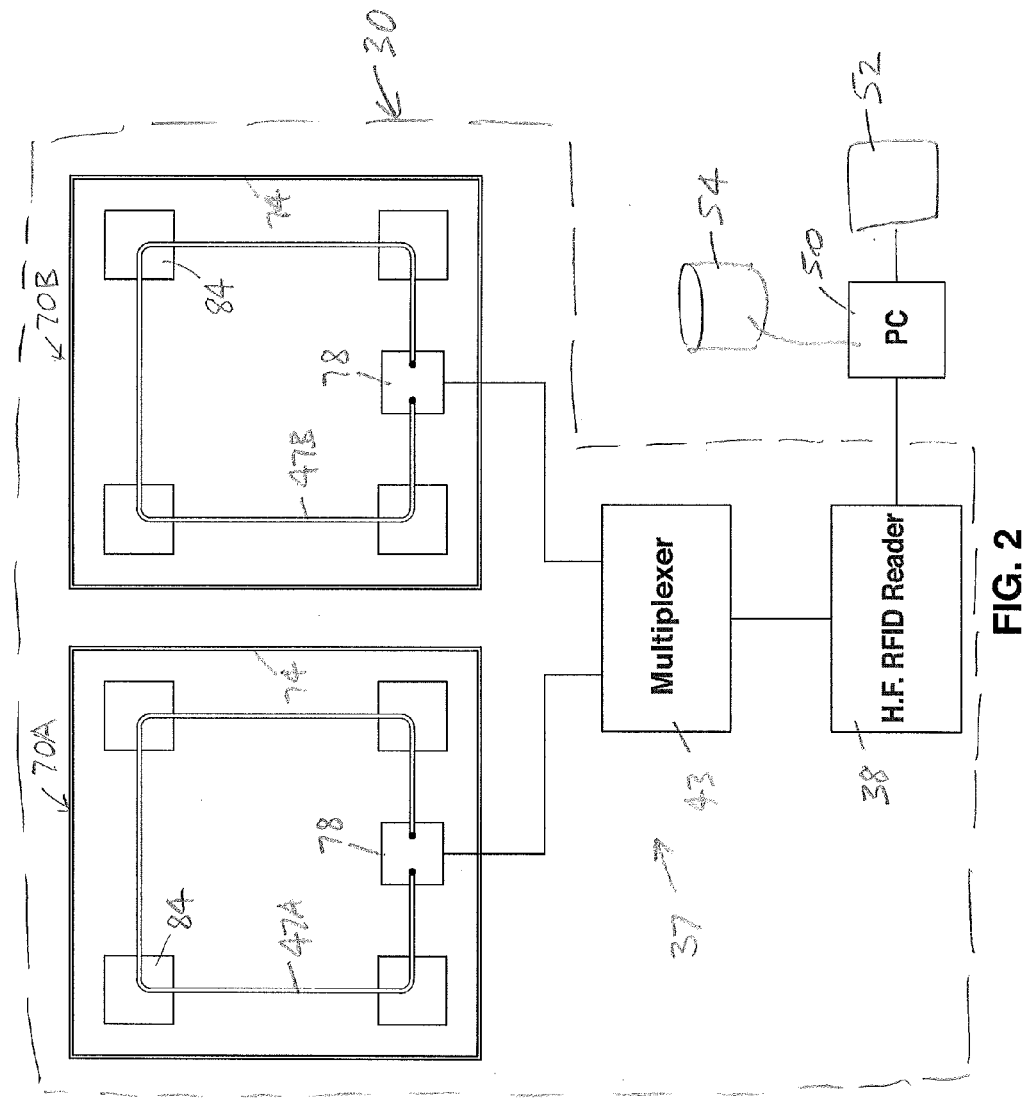
FIG. 2 is a schematic illustration of an embodiment of the system of the invention.
Figure 3:
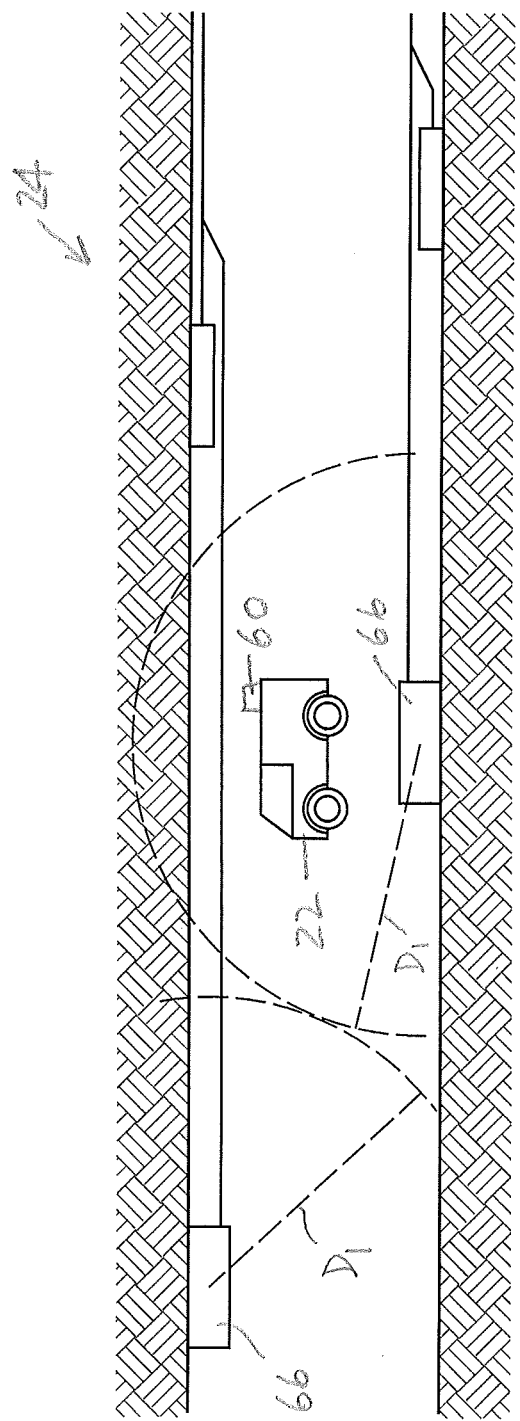
FIG. 3 is a schematic illustration of regional RFID readers positioned in a region.

As illustrated in FIGS. 1D-1F, the board subassembly 30 includes two shield elements, designated 70A and 70B for convenience, positioned on the body element 32 for alignment with the portions 36A and 36B respectively.

In FIG. 1C, only one shield element 70 is illustrated, for clarity of illustration. As can be seen in FIG. 1C, in one embodiment, the shield element 70 preferably includes one or more wall regions 74 projecting from the rear surface 72 in a direction away from the front surface 34, i.e., projecting rearwardly. It is also preferred that the wall region 74 defines a well or well region 76 for substantial alignment of the well region 76 with the portion 36 corresponding thereto. The antenna 47 associated with such corresponding portion 36 is located in the well 76.

The shield element 70 preferably is secured to the rear surface 72 of the body element 32 by any suitable means. Preferably, the shield element 70 is dimensioned so as to limit or shape the electromagnetic field for a particular portion 36 so that the portion 36 is located within the electromagnetic field, and the outer boundaries of the portion and the electromagnetic field therefor substantially coincide with each other. That is, the shield element 70 acts as a wave guide.

The shield element 70 may be formed of any suitable material or materials. For example, the shield element 70 may be formed of galvanized steel sheet metal having any suitable thickness. It has been found, for example, that an 18 gauge thickness (0.0516 inch (approximately 1.31064 mm)) is suitable.

It is also preferred that the antenna 47 is located relative to the shield element 70 by one or more spacer elements 84. The spacer elements 84 are formed and positioned to locate the antenna as required in order for the electromagnetic field coupling the board RFID reader 38 and the board RFID tag 28 to be shaped so that it is within the portion 36 associated with the antenna. Preferably, the spacers are made of material that is substantially electrically non-conductive. For example, the spacers 84 preferably are made of a suitable plastic material. As can be seen in FIG. 1C, the spacers 84 for a particular antenna 47 preferably are secured to the rear surface 72 in the well region 76, on the area 73 of the rear surface 72 that is substantially aligned with the portion 36 with which that antenna 47 is associated.

It is also preferred that the board RFID reader subassembly 37 preferably includes a tuner 78 (FIG. 1C). Those skilled in the art would appreciate that, with the tuner 78, the antenna 47 connected therewith is tunable for optimum performance depending on a number of factors, including those related to the immediate environment of the board subassembly 30.

It has been found that the board RFID tags 28, when positioned on the board in one of the portions 36, preferably are separated by a minimum distance "X" (FIG. 1B). For example, in one embodiment, the tags 28 preferably are separated by about 1 cm (approximately 0.393701 inch).

In summary, in one embodiment, the system 20 preferably includes the board RFID tags 28 and the board subassembly 30. The board subassembly 30 preferably includes the body element 32 with a front surface 34 divided into the portions 36, and each of the portions 36 corresponds to the region assigned to it. The region may be defined, for example, according to physical location, and/or operational or administrative aspects.

The board subassembly 30 preferably also includes the board RFID reader subassembly 37, which includes the antennas 47, the board RFID reader 38, and the multiplexer 43 (FIG. 2). Each of the tags 28 has a memory 40 including tag data 42 that is related to only one mobile element 22, i.e., each tag 28 corresponds to only one mobile element 22.

The board tags 28 located in the respective portions 36 and the antennas 47 associated with the respective portions are configured to be coupled via respective electromagnetic fields associated with the respective portions 36 so that the tag memories 40 of the tags 28 located in the respective portions are readable by the board RFID readers connected with the antennas associated with the respective portions. In addition, in one embodiment, the board RFID reader subassembly 37 preferably is configured to transmit new data to the board RFID tags 28 located in the respective portions.

Preferably, the board subassembly 30 also includes the shield element 70. The shield element is formed to guide the respective electromagnetic fields associated with the respective portions so that the respective portions are within the electromagnetic fields respectively.

From the foregoing, it can be seen that the tag board assembly 30 effectively addresses basic requirements, such as determining when a particular worker entered the facility, and also where (i.e., in which region) the worker should be found during the predetermined time period. Alternatively, where the mobile element is, for example, an item of equipment, the tag board assembly 30 would efficiently be able to locate the equipment, to indicate when the equipment was deployed to a particular region, and when it is to be moved elsewhere.

However, depending on the requirements for the system, more information can be used and provided by it. The tag memory 40 for a particular board RFID tag 28 preferably includes any desired relevant information about the mobile element 22 (i.e., the worker, or the item of equipment), in addition to identification information that enables RFID readers to identify the mobile element 22. For example, if the worker 22 has particular expertise or qualifications, that information preferably is included in the tag memory 40.

For instance, at an underground mine, an example of relevant expertise would be training in mine rescue techniques. If an accident occurs, information identifying those of the workers on site who have mine rescue training may be required quickly. The tag board assembly 30 would be able to provide such information quickly. Also, the tag board assembly 30 would indicate the locations of the workers with the relevant qualifications.

If the mobile element is equipment, then identification information would include such information as the equipment brand, serial number and capacity.

It will be understood that the superficial resemblance of the tag board assembly 30 to the simple tag boards or magnetic boards of the prior art is intentional. This is because it is believed that, as a practical matter, such superficial resemblance as there may be encourages those currently using the prior art tag boards or magnetic boards to use the tag board assembly 30, notwithstanding the significant functional differences between the tag board assembly 30 and the prior art, as described herein. Among other things, it is believed to be important for acceptance of the tag board assembly 30 that the body element be unitary, or if not, at least that parts thereof are in close proximity to each other. Because of this, the shield element 70 is needed to enable the antennas for each respective portion to function notwithstanding their relatively close proximity to each other.

The following are the specifications of certain components in one embodiment of the tag board assembly. These specifications are exemplary only. Those skilled in the art would be aware of suitable alternatives.

Shield Element
Galv steel 18 gauge
24"×24"×1.5"
Spacers
lexan antenna mounts
4"×4"×3/8"

Antenna Tuning Board
13.56 MHz
Sma HF socket
Max 8 watts
Antenna
1/4" od copper tube (hollow)
18"×18" square 1.5" radius corners
Cover
polyethelyne 3/16" thickness
cup hook mounted to 2"×2" grid pattern
fully enclosed
rf connection RG58
HF Reader
standard HF reader 13.56 MHz
1.2 watts
Sma connector 50 Ω
Multiplexu
13.56 MHz
outputs controlled by reader
4-8 antennas
switch rate less than 1 ms
sma socket In one embodiment, it is preferred that each of the board RFID readers is configured to transmit new data to the board RFID tags respectively that are in the portion with which the antennas 47 connected with such board RFID reader are associated. In this embodiment, the board RFID tag 28 preferably includes an alert device 48 configured to indicate that the new data has been transmitted thereto. This could be useful where, for example, a foreman needs to talk to a particular worker at the end of the shift i.e., when the worker is present at the tag board assembly to move his board RFID tag from one portion 36 to another. The "new data" may simply be a message to speak to the foreman as soon as convenient.

Alternatively, the new data may be new information that is written into the tag memory 40.

In one embodiment, for example, the alert device 48 preferably is adapted to provide a visual signal upon the new data being received by the board RFID tag 28 that includes the alert device 48. For example, the alert device 48 may include a light source (e.g., an LED) that is energized upon the alert device receiving the signal, to provide the alert. Alternatively, or in addition, the alert device 48 may include a display on which a message related to the new data may be displayed. Alternatively, or in addition, the alert device 48 preferably is adapted to provide an audible signal upon the new data being received by the board RFID tag that includes the alert device 48.

It can be seen that upon any new data being transmitted to the tag memory for a particular board RFID tag, the worker associated with that board RFID tag (or, in the case of an item of equipment, the worker responsible for the RFID tag) can be made aware of the transmission of such new data by actuation of the alert device 48 (e.g., a light source flashing, a text or other message, and/or an audible indicator or audible message), and respond accordingly.

This feature facilitates updating data in the board tag memory 40. For instance, if the worker has a new qualification or expertise, then the worker's information in the board tag memory also should be updated accordingly. Similarly, where the mobile element is an item of equipment, and if the item of equipment is due for service or for some reason should not be operated without an upgrade, this information may be written into the board tag memory for that item of equipment. An appropriate alert signal may be provided as well, to actuate the alert device, which may in turn inform the worker that his information has been updated.

In one embodiment, the board RFID reader 38 preferably is communicatively connected with one or more board processors 50 (FIG. 2) for processing the tag data and the time data received from the respective board RFID readers 38. Such communication may be via any suitable means e.g., wireless, or non-wireless.

It is also preferred that the board processor 50 is networked with (i.e., able to communicate with) other computing devices 52 via a local area network and/or a wide area network for transmission of the tag data and the time data to the other computing devices 52 and for transmitting the new data between the board processor 50 and the other computing devices. It will be understood that the other computing devices may include any suitably configured computing devices and may include, for example, handheld communications devices.

Preferably, the board processor 50 is connected with a database or memory subsystem 54, and such other devices (not shown) as may be necessary, as is well known in the art (FIG. 2).

In one embodiment, the board processor 50 preferably is configured to determine whether any of the board RFID tags 28 have been positioned in a specific one of the portions for an actual time period that is greater than a preselected time period for the mobile element 22 associated therewith respectively. Also, the board processor 50 is configured to transmit an overtime alert signal to one or more of the other computing devices upon detecting that the actual time period while any one of the board RFID tags has been in the specific one of the portions is greater than the preselected time period for the mobile element 22 associated therewith respectively.

This feature is useful, for example, if the worker has been in a particular region (e.g., "underground") past the preselected time period. In this case, the preselected time period may end, for example, approximately at the time when the worker's shift ends, or alternatively, may be after a selected time period after the end of his shift, e.g., to allow for short delays in travel. The alert signal preferably is transmitted upon its generation to computing devices used by the relevant supervisors, i.e., via the network. In this way, when the worker spends more time than the preselected time period in a particular region, those responsible are immediately notified, so that they may take appropriate action.

It will be understood that the preselected time period may be any time period. For many types of workers, the preselected time period during which they are in any particular region may be less than a full shift. For example, the worker may be a foreman or a skilled technician (e.g., an electrician) who only intends to spend a relatively short time in a particular region.

This feature of determining whether one of the mobile elements 22 has been in the same portion for a time period longer than the preselected time period therefor may also be useful where the mobile element 22 is not a worker, but instead is an item of equipment, or materials. In this case, the preselected time period would not necessarily be the time when a first shift ends, or shortly thereafter. For example, if the mobile element is an item of equipment (e.g., a welder unit), it may be that the mobile element is expected to remain in a particular region 24 for several shifts before the project for which it is used is completed. The system 20 can in this way be used to facilitate improved utilization of equipment or materials.

It will be understood that the system of the invention may also be used, with additional elements thereof, to determine the locations of the mobile elements 22 in the regions 24, within predetermined accuracy. In one embodiment, for instance, the board RFID tags 28 preferably are secured to the mobile elements 22 with which they are associated at the beginning of the preselected time period.

As noted above, it is preferred that each of the board RFID tags is removable, substantially at the beginning of the preselected time period therefor respectively, from the initial portion. Also, in one embodiment, the board RFID tag preferably is then securable to the mobile element with which the board RFID tag is associated. Preferably, upon the board RFID tag being removed from the initial portion 36, the board RFID reader associated with the initial portion 36 detects the removal thereof, and generates time data that specifies when the board RFID tag is removed.

Figure 4:
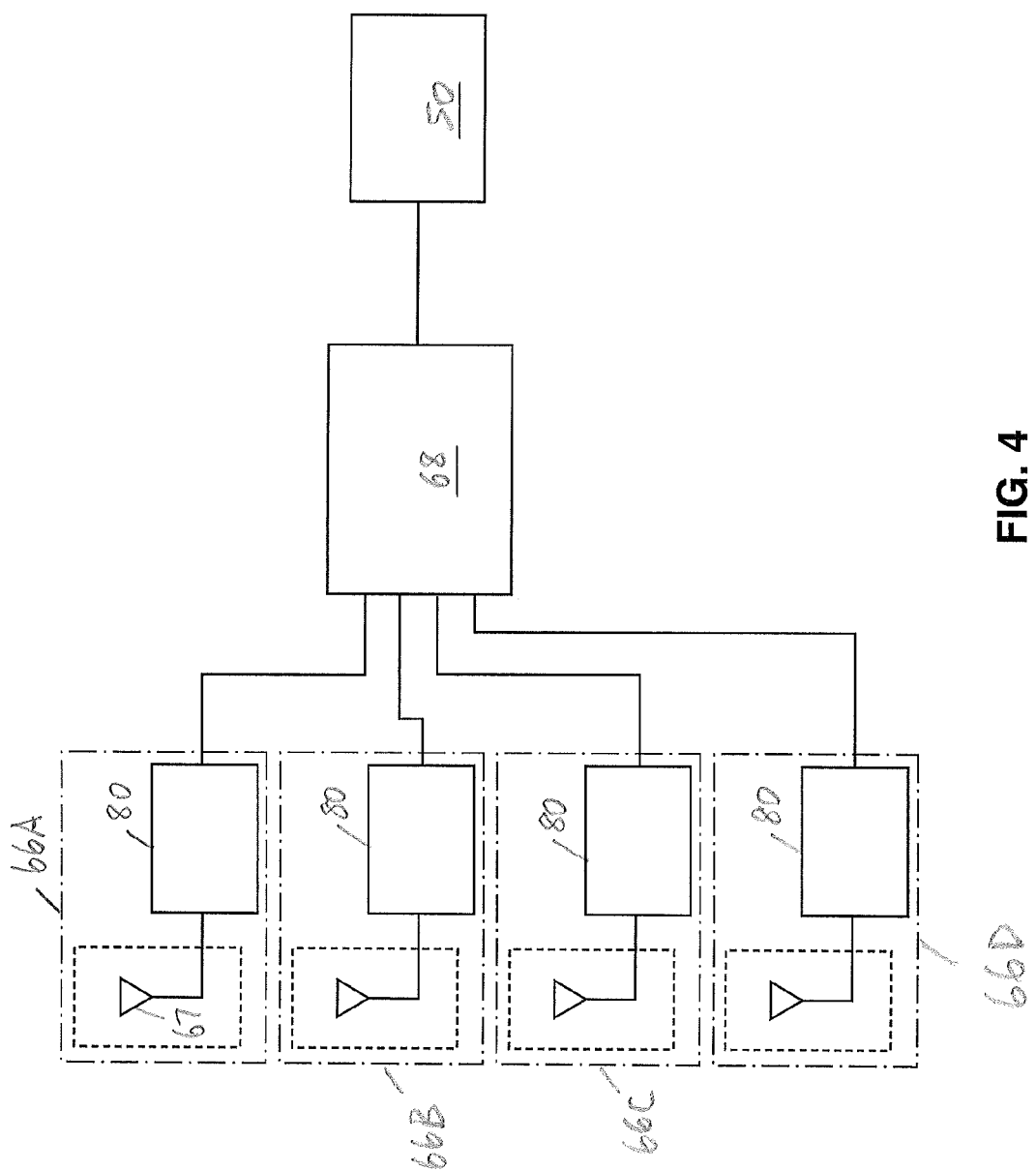
FIG. 4 is a schematic illustration of certain elements of an alternative embodiment of the system.

The system 20 preferably additionally includes one or more regional RFID reader subassemblies 66 positioned in a selected one of the regions 24, for reading the tag memories 40 of the board RFID tags 28 secured to the mobile elements 22 respectively when the mobile elements 22 are within a predetermined range distance "$D_1$" from the regional RFID reader subassembly 66, to identify the board RFID tags that are within the predetermined range distance respectively (in "identification data") and to provide location data approximately locating the mobile elements 22 to which the board RFID tags 28 are respectively secured. Preferably, each of the regional RFID reader subassemblies 66 includes an antenna 67 and a regional RFID reader 80 (FIG. 4). It will be understood that the regional RFID reader subassembly 66 preferably includes the elements described above in connection with the board RFID reader subassembly 37. With the regional RFID reader subassemblies 66, the system 20 may provide information about the locations of the board RFID tags within the region, and therefore also information about the locations of the mobile elements associated therewith.

In this embodiment, where the mobile element 22 is a worker, the worker removes his board RFID tag 28 from the initial portion 36 and secures his board RFID tag to himself in any convenient manner (e.g., to his clothing, or to his safety helmet) when his shift begins. When the worker removes his board RFID tag 28 from the initial portion 36 (e.g., the "surface" portion 36), the board RFID reader 38 for that portion determines that the board RFID tag 28 has been removed. The time data indicating when the board RFID tag 28 was removed preferably is transmitted to the board processor 50.

It will be understood that the regional RFID reader subassemblies 66 preferably are positioned generally uniformly throughout the region, for efficient operation. With the regional reader subassemblies 66, the location of the worker can be determined from time to time, with acceptable accuracy. It will be understood that the identification and location data identifying the worker and his location at a particular time preferably is transmitted to the board processor 50 by any suitable means.

Those skilled in the art would appreciate that the location data and the time information associated therewith can be important. For example, if there is an accident that affects those in a particular region, then the identification and location data and the time information associated therewith enables emergency personnel to know, with some accuracy, where the workers are located.

Where the mobile element is, for example, an item of equipment, then the board RFID tag therefor is secured to the equipment in any suitable manner. The location data for the equipment and the time information associated facilitates better utilization of the equipment. Also, the location data for equipment in a region may be important in the event of an accident in the region.

In one embodiment, it is preferred that the board processor 50 is configured to determine whether any of the board RFID tags 28 is detectable by any of the board RFID readers 38 within the preselected time period. Also, the board processor 50 is further configured to generate an overtime alert signal related to the board RFID tags that are not detected in the portions 36. The overtime alert signal is transmitted to one or more of the other computing devices.

At the end of the preselected time period (e.g., at the end of the worker's shift), the worker's board RFID tag 28 is returned to the initial portion 36 (e.g., "surface"), as the worker does not at that point intend to enter any other of the regions 24. From the foregoing, it can be seen that if the worker's board RFID tag is not returned to the initial portion by approximately the end of the preselected time period, then the overtime signal is generated, and transmitted. The overtime alert signal is intended to require those responsible (e.g., a foreman) to take appropriate action.

In one embodiment, the system may also be used to determine whether any of the mobile elements 22 is in a region other than the selected region therefor, i.e., a "non-selected" region. It is preferred that the board processor 50 is configured to determine whether any of the board RFID tags 28 is detected in one or more non-selected ones of the regions 24, according to the location data therefor. Also, the board processor 50 preferably is further configured to generate a location alert signal related to the board RFID tags that are in the one or more non-selected regions, the located alert signal being transmitted to one or more of the other computing devices. Once the location alert signal is so transmitted, those who are responsible may take appropriate action.

In an alternative, in one embodiment, the system 20 preferably also includes a number of attached RFID tags 60. As will be described, each of the attached RFID tags 60 preferably is secured to the mobile element 22 assigned therewith. It is also preferred that each of the attached RFID tags 60 has an attached tag memory 62 including attached tag data 64 that is related to the mobile element 22 to which the attached RFID tag 60 is secured respectively. It is also preferred that the system 20 includes one or more regional RFID reader subassemblies 66 positioned in a selected one of the regions 24, for reading the attached tag memory 62 (FIG. 1G) of the attached RFID tags 60 respectively when the attached RFID tags 60 are within a predetermined distance "$D_1$" of the regional RFID reader subassembly 66, to provide the attached tag data and the location data identifying approximate location of the respective mobile elements 22 to which the attached RFID tags 60 are secured respectively. The attached RFID tag 60 may also include an alert device 65 configured to provide visual and/or audible alerts, similar to the alert device of the board RFID tag, described above.

In this embodiment, a RFID tag 28 for a particular mobile element 22 preferably is moved by the worker from the initial portion to the second portion at the start of the preselected time period, as described above. The region in which the mobile element 22 that is associated with the particular board RFID tag is located therefore can be readily determined. The additional tag (i.e., the attached RFID tag 60) also enables the location(s) of the mobile element in the selected region to be known. At the end of the preselected time period, the board RFID tag is moved by the worker from the second portion to the appropriate portion, e.g., it may be returned to the initial portion.

The attached RFID tag 60 may be secured to the mobile element 22 in any suitable manner. For example, where the mobile element 22 is a worker, the attached RFID tag 60 may be secured to the worker's clothing, e.g., coveralls, or to the worker's safety helmet. Where the mobile element 22 is an item of equipment, the attached RFID tag 60 may be secured to the equipment in any convenient manner.

In one embodiment, the system 20 preferably also includes one or more regional processors 68 in communication with the regional RFID reader subassemblies 66. Preferably, the attached tag data and the attached tag location data for the respective attached RFID tags 60 is transmittable to the regional processor 68 from the regional RFID reader subassembly 66, locate the respective attached RFID tags 60. Communication may be any suitable means. For instance, if the region is underground, the communications preferably are via hardwired communications means.

In one embodiment, the regional processor 68 preferably is in communication with the board processor 50, for transmission of the attached tag data and the attached tag location data to the board processor 50 (FIG. 4). Communication may be by any suitable means. For illustrative purposes, in FIG. 4, a number of regional RFID readers are identified by reference numerals 66A-66D and in communication with the regional RFID reader 68.

In use, the invention provides a method of identifying respective locations of mobile elements in a number of regions. The method includes providing the tag board assembly, including the board RFID tags 28 and the board subassembly 30.

As described above, a selected one of the board RFID tags is moved from the initial portion 36 to the second portion 36. The second portion corresponds to the region 24 in which the mobile element 22 associated with the selected one of the board RFID tags 28 is to be located within the preselected time period.

The method also includes, upon the selected one of the board RFID tags being positioned in the second selected one of the portions 36, with the board RFID reader subassembly 37, detecting the selected one of the board RFID tags in the second selected one of the portions 36, to generate time data that specifies when the selected one of the board RFID tags is moved to the second selected one of the portions 36.

It will be appreciated by those skilled in the art that the invention can take many forms, and that such forms are within the scope of the invention as claimed. The scope of the claims should not be limited by the preferred embodiments set forth in the examples, but should be given the broadest interpretation consistent with the description as a whole.

We claim:

1. A system for identifying respective locations of mobile elements in a plurality of regions, each said mobile element to be located in a selected one of the regions within a preselected time period, the system comprising:
   a tag board assembly comprising:
      a plurality of board RFID tags, each said board RFID tag being associated with a selected one of the mobile elements respectively;
      a board subassembly comprising:
         a body element with a front surface divided into a plurality of portions of the front surface that correspond to the regions respectively;

at least one board RFID reader subassembly comprising:
  a plurality of antennas, said antennas being associated with respective portions;
  at least one board RFID reader that is operatively connected with said antennas;
each of the board RFID tags respectively comprising a tag memory with tag data thereof related to the selected one of the mobile elements with which each said board RFID tag is respectively associated;
each said board RFID tag located in a first one of the portions and the antenna associated with said first one of the portions being configured to be coupled via a first electromagnetic field in which said first one of the portions is located such that each said tag memory of each said board RFID tag located in said first one of the portions is readable by said at least one board RFID reader connected with the antenna associated with said first one of the portions;
each said board RFID tag being movable from said first one of the portions to a second one of the portions that corresponds to the selected one of the regions where the mobile element associated with each said board RFID tag respectively is to be located in the preselected time period;
each said board RFID tag located in the second one of the portions and the antenna associated with the second one of the portions being configured to be coupled via a second electromagnetic field in which said second one of the portions is located such that said at least one board RFID reader subassembly therefor generates time data that specifies when the board RFID tag is moved to the second one of the portions;
the board assembly additionally comprising at least one electromagnetically opaque shield element, said at least one shield element being secured to a rear surface of the body element opposed to the front surface thereof and positioned to locate the antennas associated with the respective portions for guiding the respective first and second electromagnetic fields for the first and second portions respectively such that said first and second electromagnetic fields are substantially within the respective first and second portions;
said at least one shield element comprising:
  at least one wall region projecting from the rear surface in a direction away from the front surface;
  said at least one wall region defining at least one well for substantial alignment with at least a selected one of the portions; and
  the antenna associated with said selected one of the portions being located in said at least one well.

2. The system according to claim 1 in which each said antenna is located relative to said at least one shield element by at least one spacer element.

3. The system according to claim 1 in which said at least one board RFID reader subassembly additionally comprises a plurality of tuners operatively connected with the antennas respectively, for tuning the antennas respectively.

4. The system according to claim 1 in which said at least one board RFID reader is configured to transmit new data to said board RFID tags respectively that are in the portions with which the antennas connected with said at least one board RFID reader are associated, and each said board RFID tag comprises an alert device configured to indicate that the new data has been transmitted thereto.

5. The system according to claim 4 in which the alert device is adapted to provide a visual signal upon the new data being received by the board RFID tag comprising the alert device.

6. The system according to claim 4 in which the alert device is adapted to provide an audible signal upon the new data being received by the board RFID tag comprising the alert device.

7. The system according to claim 4 in which:
  said at least one board RFID reader is communicatively connected with at least one board processor for processing the tag data and the time data received from said at least one board RFID reader, and for transmitting the new data to said at least one board RFID reader;
  said at least one board processor is configured to determine whether any of the board RFID tags have been positioned in a specific one of the portions for an actual time period that is greater than the preselected time period for the mobile element associated therewith respectively; and
  said at least one board processor is also configured to transmit an overtime alert signal to one or more of the other computing devices upon detecting that the actual time period while any one of the board RFID tags has been positioned in the specific one of the portions is greater than the preselected time period for the mobile element associated therewith respectively.

8. A system for identifying respective locations of mobile elements in a plurality of regions, each said mobile element to be located in a selected one of the regions within a preselected time period, the system comprising:
  a tag board assembly comprising:
    a plurality of board RFID tags, each said board RFID tag being associated with a selected one of the mobile elements respectively;
    a board subassembly comprising:
      a body element with a front surface divided into a plurality of portions of the front surface that correspond to the regions respectively;
      at least one board RFID reader subassembly comprising:
        a plurality of antennas, said antennas being associated with respective portions;
        at least one board RFID reader that is operatively connected with said antennas;
        at least one multiplexer operatively connecting the antennas and said at least one board reader;
      each of the board RFID tags respectively comprising a tag memory with tag data thereof related to the selected one of the mobile elements with which each said board RFID tag is respectively associated;
    said board RFID tags located in the respective portions and the antennas associated with the respective portions being configured to be coupled via respective electromagnetic fields associated with the respective portions such that the tag memories of said board RFID tags located in the respective portions are readable by said at least one board RFID reader connected with the antennas associated with the respective portions;
    at least one electromagnetically opaque shield element, said at least one shield element being secured to a rear surface of the body element opposed to the front surface thereof and formed to guide the respective electromagnetic fields associated with the respective portions such that the respective portions are within the electromagnetic fields respectively;

the board subassembly additionally comprising:
- a plurality of spacer elements, for locating said antennas in predetermined locations therefor in relation to the portions that said antennas are associated with respectively, and in relation to said at least one shield element;

said at least one board RFID reader subassembly additionally comprising:
- a plurality of tuners operatively connected with the antennas respectively, for tuning the antennas respectively;

said at least one shield element comprising:
- at least one wall region projecting from the rear surface away from the front surface, said at least one wall region being associated with at least a selected one of the portions;
- said at least one wall region defining at least one well for substantial alignment with at least a selected one of the portions; and
- the antennas associated with said selected one of the portions being located in the predetermined locations therefor in said at least one well.

* * * * *